US008322982B2

(12) United States Patent
Cooper et al.

(10) Patent No.: US 8,322,982 B2
(45) Date of Patent: Dec. 4, 2012

(54) VANE FIXING APPARATUS AND METHOD

(75) Inventors: Joseph B. Cooper, Brize Norton (GB); Paul R. Hayton, Bristol (GB)

(73) Assignee: Rolls-Royce PLC, London (GB)

( * ) Notice: Subject to any disclaimer, the term of this patent is extended or adjusted under 35 U.S.C. 154(b) by 566 days.

(21) Appl. No.: 12/693,718

(22) Filed: Jan. 26, 2010

(65) Prior Publication Data

US 2010/0209240 A1 Aug. 19, 2010

(30) Foreign Application Priority Data

Feb. 16, 2009 (GB) .................................. 0902579.2

(51) Int. Cl.
*F02C 7/20* (2006.01)
*F03B 3/18* (2006.01)

(52) U.S. Cl. ..................... 415/209.3; 415/189; 415/190; 60/798

(58) Field of Classification Search ............... 415/208.1, 415/209.2, 209.3, 213.1, 190, 189, 196, 209.4, 415/191; 60/798; 248/500, 510, 346.01, 248/346.03, 222.14
See application file for complete search history.

(56) References Cited

U.S. PATENT DOCUMENTS

| | | | |
|---|---|---|---|
| 4,920,742 | A * | 5/1990 | Nash et al. ...................... 60/799 |
| 6,027,071 | A | 2/2000 | Lair |
| 2008/0078163 | A1 | 4/2008 | Burdick et al. |

FOREIGN PATENT DOCUMENTS

EP 0 344 877 A1 12/1989

OTHER PUBLICATIONS

Jul. 14, 2009 Search Report issued in British Patent Application No. GB0902579.2.

* cited by examiner

*Primary Examiner* — Ninh H Nguyen
*Assistant Examiner* — William Grigos
(74) *Attorney, Agent, or Firm* — Oliff & Berridge, PLC

(57) ABSTRACT

A vane fixing apparatus for removably fixing a vane plate (14) to a web (12) is described. The vane fixing apparatus comprises a mounting bracket (16) attached to the vane plate (14), and a mounting block (20,30) held on the web (12) by at least one fastener (18), wherein the mounting block (20,30) is moveable between a first configuration in which the mounting bracket (16) may engage and disengage the mounting block (20,30) and a second configuration in which the mounting block (20,30) securely retains the mounting bracket (16) relative to the web (12), and wherein the mounting block (20,30) is moveable between the first and second configurations by operation of the fastener (18).

9 Claims, 3 Drawing Sheets

VANE FIXING APPARATUS AND METHOD

The present invention relates to fixing apparatus for a vane and to a method of fixing a vane, and is concerned particularly, although not exclusively, with a vane fixing apparatus and method of fixing a vane in a duct, such as an exhaust duct of an engine.

In the exhaust duct of a gas turbine engine a plurality of vanes of struts are attached to a duct casing and extend between walls of the duct to support it and to maintain its shape.

Previously considered vane designs usually comprise a complex assembly which is welded and/or riveted together as an integral structure, or else is cast as part of the duct.

The vanes are disposed in the path of hot exhaust gases from the engine and so can become hot themselves. To counter this heating, the vane is designed to have a substantially hollow interior which permits the flow of cooling air within. The cooling air can be fed under pressure from the compressor of the engine through the interior of the vane to cool its inner surfaces, and then allowed to pass out of the vane to join the core flow.

From time to time it is necessary to remove the vanes from the engine, for example to repair or maintain them, or else to replace them with differently sized or shaped vanes so as to alter the "throat" area of the duct during testing.

Previously, to remove a vane from an exhaust duct would require considerable disassembly of the duct itself. Also, since the vane plates would typically be welded together with other structural components of the vane, the effects of thermal strain as the different components expand could include distortion or damage of the vane itself.

In view of the above an alternative design has been proposed in which the vane comprises an internal web, or strut, which is permanently fixed in relation to the duct, and one or more vane plates removably attached to the web.

The present invention aims to provide fixing apparatus, and a method of fixing, for a removable vane plate.

The invention is defined in the attached independent claims to which reference should now be made. Further preferred features may be found in the sub-claims appended thereto.

According to a first aspect of the present invention there is provided a vane fixing apparatus for removably fixing a vane plate to a structural web in a duct, the vane fixing apparatus comprising a mounting bracket attached to a vane plate, and a mounting block carried on the web by at least one fastener, wherein the mounting block is moveable between a first configuration in which the mounting bracket may slideably engage and slideably disengage the mounting block, and a second configuration in which the mounting block securely retains the mounting bracket relative to the web, and wherein the mounting block is moveable between the first and second configurations by operation of the fastener, the vane fixing apparatus being provided such that, in use, it is shielded from the duct by the vane plate.

A preferred embodiment of the present invention will now be described, by way of example only, with reference to the accompanying diagrammatic drawings, in which.

Figure 1:
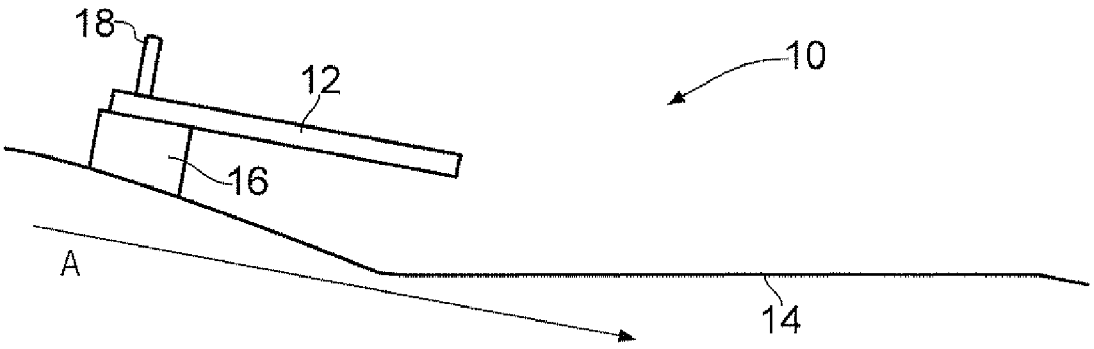
FIG. 1 is a schematic plan view of a vane assembly according to an embodiment of the present invention.

Turning to FIG. 1, this shows generally at 10 a part of a vane for use in an exhaust duct of a gas turbine engine (not shown). The vane 10 comprises a structural web 12 or strut, and a vane plate 14. Arrow A shows the direction of hot exhaust gas flow—so called core flow—in use.

The entire vane in use would include another substantially identical vane plate (not shown) on the opposite side of the web 12, and a permanent leading edge profile to which the two vane plates would be attached at their leading edges (with respect to arrow A). At their trailing edges the two vane plates would be welded together.

The vane plate 14 is removably mounted on the web 12 by means of mounting bracket 16 which is itself attached to web 12 by two fasteners in the form of bolts 18.

Figure 2:
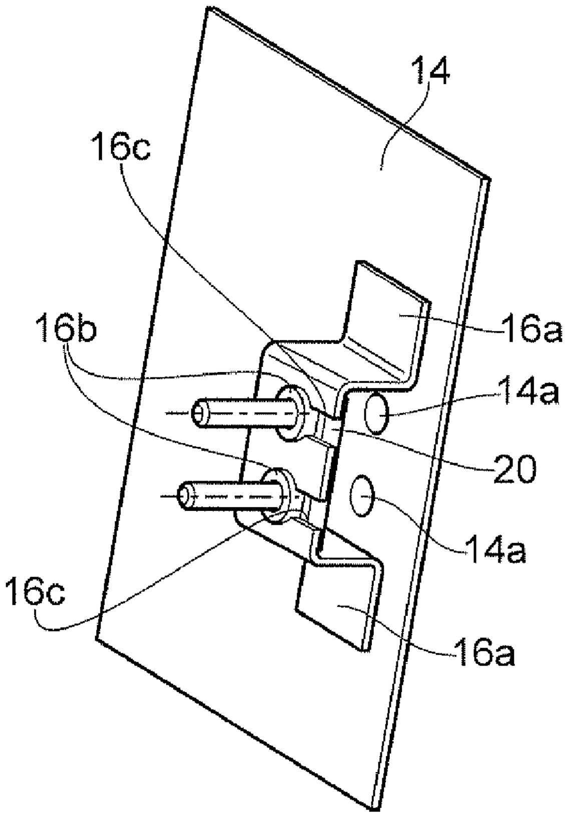
FIG. 2 shows a part of a vane plate according to the embodiment of FIG. 1.

FIG. 2 shows a portion of the vane plate 14. The bracket 16 has tangs 16*a* which are riveted to the vane plate 14 by countersunk-head rivets (not shown). A mounting block 20 has cylindrical "pins" or collar-like projections 22 which when the plate is secured to the web (not shown) extend through corresponding holes 16*b* on the bracket 16. Countersunk-head bolts 18 which threadedly engage the web, extend through both the projections 22 and hence the holes 16*b* of the bracket, as will be described below. Access holes 14*a* in the plate 14 allow a screwdriver or alien key to engage the bolts 18.

The holes 16*b* of the bracket 16 lead to narrow slots 16*c* which extend towards a leading edge. The slots are slightly wider than the threaded body of the bolts 18.

Figure 3:
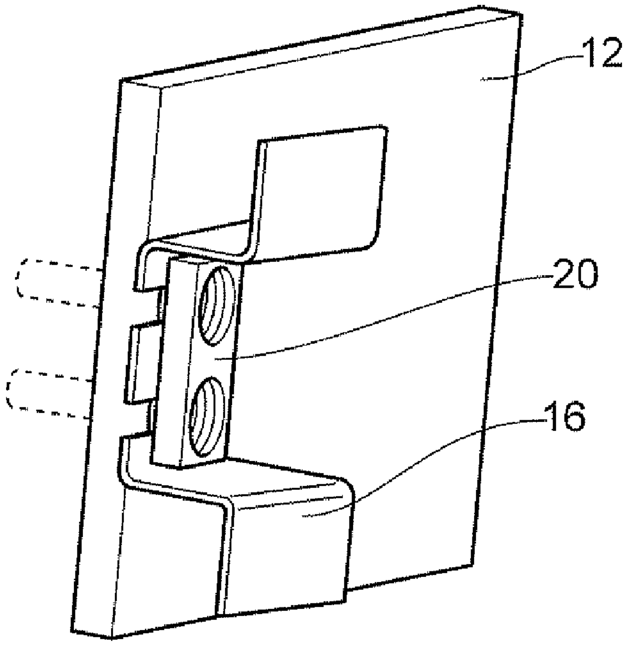
FIG. 3 shows a part of a web according to the embodiment of FIGS. 1 and 2.

FIG. 3 shows a portion of the web 12, the bracket 16 and the mounting block 20 as they would be when the vane plate (not shown) is mounted on the web 12. In this drawing the vane plate 14 and bolts 18 are omitted for clarity, though broken lines show the positions taken by the bolts 18 when fully engaged with the web.

Figure 4:
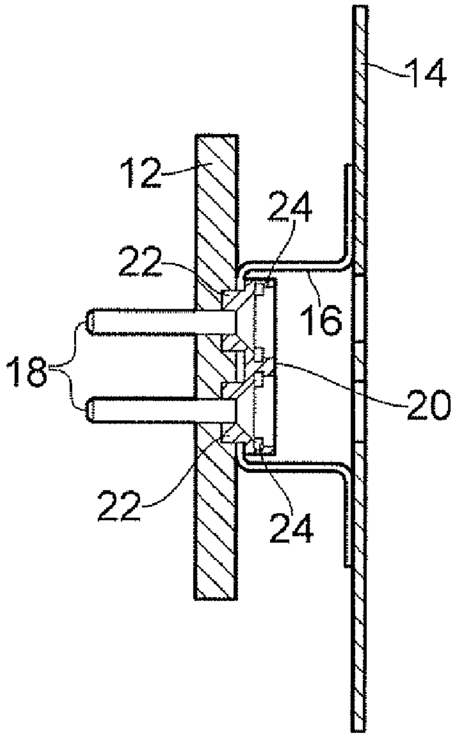
FIG. 4 is a part-sectional view of the plate and web of the embodiment of FIGS. 1-3, shown from the front, or leading edge, of the vane.

FIG. 4 is a part-sectional view taken in the vertical plane and viewed from the leading edge of the vane with the assembly in the vane-attached configuration. FIG. 4 shows the countersunk-head bolts 18 located within the block 20 passing through the block 20 and bracket 16, threadably engaging counterbores of the web 12. Annular spring clips 24 secure the bolts 18 in the block 20.

With reference to FIGS. 1-4 together, when the vane plate 14 is to be removed from the web 12, firstly the bolts 18 are partly withdrawn from the web 12 by a screwdriver or alien key (not shown) inserted through access holes 14*a* in the vane plate 14. The bolts are turned one half rotation each, alternately, until the mounting block 20, to which the bolts are secured by clips 24, is sufficiently withdrawn that its pins 22 are clear of the holes in the web 12, and also are clear of the holes 16*b* in the mounting bracket 16. At this point the mounting bracket 16 and the vane plate 14, may be slid rearwardly (with respect to the direction of flow of exhaust gases), the slots 16*c* allowing the bracket 16 to slide clear of the bolts 18, which remain in threaded engagement with the web 12.

The vane plate 14, or an alternative plate with the same design of mounting bracket 20, can then be remounted on the web 12 by reversing the above steps, namely by sliding the mounting bracket 16 into position over the bolts 18 and then turning the bolts using a screwdriver or alien key through access holes 14*a* in the vane plate, until the pins 22 of the block 20 become located in the holes 16*b* of the bracket 16 and in the counterbores of the web 12. The vane is then securely mounted on the web, with the vane fixing apparatus (i.e. the mounting bracket(s), mounting block(s) and fastener(s)) being shielded from the duct by the vane plate (14). Hence, in use, only the external surface of the vane plate is exposed to fluid flow in the duct, and the vane fixing apparatus does not disturb the fluid flow.

Figure 5:
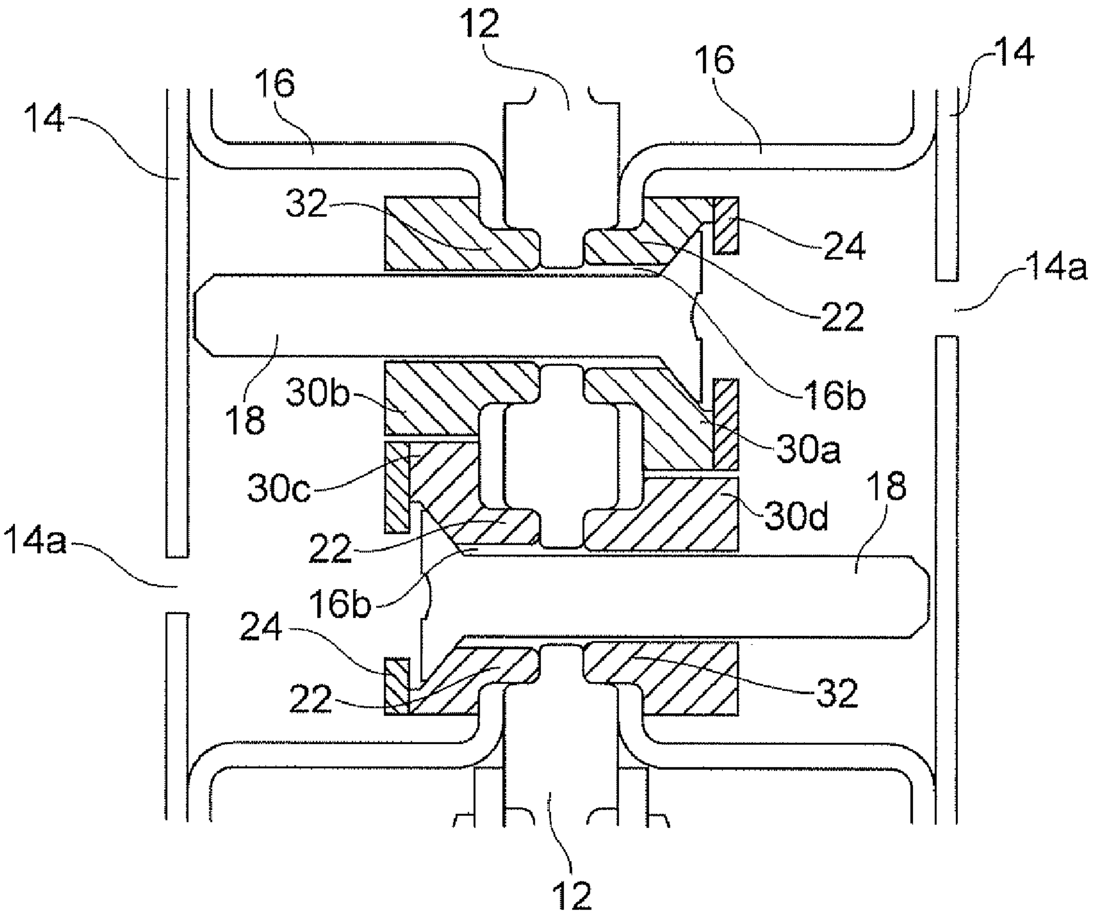
FIG. 5 is a sectional view of a further embodiment of the present invention.

FIG. 5 is a sectional view of a further embodiment of the invention. Features common to this and the previous examples share the same reference numerals. In the example shown two sets of bolts 18 and mounting blocks 30 are present, although it will be appreciated that the invention may be put into effect with a different number, for example one or three or more sets of bolts 18 and mounting blocks 30. The bolts 18 are shown extending in opposite directions through the web 12. In further embodiments (not shown) the bolts 18 extend in the same direction through the web 12.

The mounting blocks 30 comprise a first 30*a,c* and second 30*b,d* part, each of which have cylindrical "pins" or collar-like projections 32 which when the plate is secured to the web 12, extend through corresponding holes 16*b* on the bracket 16. Countersunk-head bolts 18 pass through a plain hole in the web 16, and extend through a plain passage in the projection 22, the holes 16*b* of the bracket and a threaded passage in the second part 30*b* of the mounting block 30. Access holes 14*a* in the plate 14 allow a screwdriver or alien key to engage the bolts 18. As in the previous examples, the holes 16*b* of the bracket 16 lead to narrow slots 16*c* which extend towards a leading edge. The slots are slightly wider than the threaded body of the bolts 18.

When the vane plate 14 is to be removed from the web 12, firstly the bolts 18 are partly withdrawn from the web 12 by a screwdriver or alien key (not shown) inserted through access holes 14*a* in the vane plate 14. The bolts 18 are turned until they are partly withdrawn from the second part 30*b,d* of the mounting block. This withdraws the pins 22 of the first part 30*a,c* of the mounting block such that they are clear of the holes in the web 12, and also are clear of the holes 16*b* in the mounting bracket 16. The bolts 18 are pushed towards the web 12, such that the pins 22 of the second part 30*b,d* of the mounting block are also clear of the holes in the web 12, and also are clear of the holes 16*b* in the mounting bracket 16. At this point the mounting bracket 16 and the vane plate 14 may be slid rearwardly (with respect to the direction of flow of exhaust gases), the slots 16*c* allowing the bracket 16 to slide clear of the bolts 18, which remain in threaded engagement with the second part 30*b,d* of the mounting block and carried by the web 12.

The vane plate 14, or an alternative plate with the same design of mounting bracket 20, can then be remounted on the web 12 by reversing the above steps, namely by positioning the mounting blocks 30*a,b,c,d* in the correct position to allow the mounting brackets 16 to slide into position over the bolts 18, and then turning the bolts using a screwdriver or alien key through access holes 14*a* in the vane plate, until the pins 22 of the blocks 30*a,b,c,d* become located in the holes 16*b* of the bracket 16 and in the counterbores of the web 12. The vane is then securely mounted on the web, with the vane fixing apparatus (i.e. the mounting bracket(s), mounting block(s) and fastener(s)) being shielded from the duct by the vane plate (14). As with the previous embodiment, only the external surface of the vane plate is exposed to fluid flow in the duct, and the vane fixing apparatus does not disturb the fluid flow.

Whereas the above described embodiments are that of a vane plate for a vane to be mounted in an exhaust duct of a gas turbine engine, it will be understood by the skilled person that the mounting arrangements described above could be employed equally in other applications where a vane plate is to be mounted to a structural web in a duct in which there is fluid flow, without departing from the scope of the invention, as defined by the claims.

The invention claimed is:

1. Vane fixing apparatus for removably fixing a vane plate to a structural web of a turbine engine in a duct, the vane fixing apparatus comprising a mounting bracket attached to a vane plate, and a mounting block carried on the web of the turbine engine by at least one fastener, wherein the mounting block is moveable between a first configuration in which the mounting bracket may slideably engage and slideably disengage the mounting block, and a second configuration in which the mounting block securely retains the mounting bracket relative to the web, and wherein the mounting block is moveable between the first and second configurations by operation of the fastener, the vane fixing apparatus being provided such that, in use, it is shielded from the duct by the vane plate.

2. Vane fixing apparatus according to claim 1 in which the fastener comprises a threaded fastener arranged in use to pass through a hole in the mounting block and to threadedly engage the web, wherein turning of the threaded fastener in a first direction causes the mounting block to adopt the first configuration and turning the threaded fastener in a second direction causes the mounting block to adopt the second configuration.

3. Vane fixing apparatus according to claim 2 wherein the threaded fastener and the mounting block are secured together by a securing clip.

4. Vane fixing apparatus according to claim 1 wherein the mounting block has at least one projection arranged in use to extend through a corresponding hole on the mounting bracket when the mounting block and mounting bracket are engaged.

5. Vane fixing apparatus according to claim 4 wherein the at least one projection comprises an annular collar arranged to extend through the hole in the mounting bracket and to receive therethrough the fastener.

6. Vane fixing apparatus according to claim 4 wherein the mounting bracket has a slot extending in a direction transverse to the hole in the mounting bracket, which slot is dimensioned so that it can receive the fastener but is not wide enough to receive the projecting portion of the mounting block.

7. Vane fixing according to claim 6 wherein the slot extends from the hole in the mounting bracket towards a leading edge of the vane in use.

8. Vane fixing apparatus as claimed in claim 1 in wherein the mounting block comprises a first part and a second part provided on opposite sides of the structural web and linked by the fastener.

9. A method of removably fixing a vane plate to a structural web of the turbine engine in a duct, the vane fixing apparatus being provided such that, in use, it is shielded from the duct by the vane plate, the method comprising slideably engaging a mounting bracket attached to the vane plate with a mounting block held on the web of the turbine engine and operating a fastener to move the mounting block from a first position, in which the mounting bracket and mounting block may be disengaged, to a second position in which they may not be disengaged.

* * * * *